United States Patent [19]

Glabiszewski

[11] 3,863,274
[45] Feb. 4, 1975

[54] ARTICULATE JOINT FOR PROSTHETIC DEVICES

[75] Inventor: Richard Glabiszewski, Duderstadt, Germany

[73] Assignee: Otto Boch Orthopadische Industries KG, Duderstadt, Germany

[22] Filed: June 6, 1973

[21] Appl. No.: 367,420

[30] Foreign Application Priority Data
June 10, 1972  Germany............................ 2228391

[52] U.S. Cl............................................. 3/27, 3/28
[51] Int. Cl............................. A61f 1/04, A61f 1/08
[58] Field of Search................................ 3/22–29, 2

[56] References Cited
UNITED STATES PATENTS

| | | | |
|---|---|---|---|
| 2,575,802 | 11/1951 | Fischer et al. | 3/2 |
| 3,694,823 | 10/1972 | May | 3/27 |
| 3,723,997 | 4/1973 | Kolman | 3/27 |

FOREIGN PATENTS OR APPLICATIONS

| | | | |
|---|---|---|---|
| 1,570,168 | 4/1969 | France | 3/27 |
| 66,257 | 4/1969 | E. Germany | 3/27 |
| 410,424 | 5/1934 | Great Britain | 3/28 |

OTHER PUBLICATIONS
"Experimental Knee Locks and Controls" in Human Limbs and their Substitutes, by Klopsteg et al., McGraw-Hill Book Co., Inc., New York, Toronto, London, 1954, pp. 531–533, Fig. 17.39.

*Primary Examiner*—Ronald L. Frinks
*Attorney, Agent, or Firm*—Michael S. Striker

[57] ABSTRACT

An articulated joint for prosthetic devices consists of a normally stationary member, another member rotatably connected therewith, and two spaced parallel shafts. One of the shafts is rotatable and the rotatable member is connected to this shaft so that the shaft and this member rotate as a unit. A collar is swingably mounted about the other, stationary shaft and this collar also surrounds the rotatable shaft. The stationary shaft is secured to the stationary member and the collar abuts the latter. A sleeve is interposed between the collar and the rotatable shaft, and the sleeve is provided with a slit therethrough. The collar, in turn, is provided with a slot and, as a result of this construction, the sleeve and collar are able to yield elastically in a direction circumferentially of the rotatable shaft. When a force is applied to the joint, the rotatable member abuts the collar so that the force is transmitted via the collar and stationary shaft to the stationary member or vice versa. This force then causes the collar and, hence, the sleeve, to yield in a direction circumferentially of the rotatable shaft so that the sleeve frictionally engages the latter to thereby prevent rotation of the same.

11 Claims, 4 Drawing Figures

3,863,274

ARTICULATE JOINT FOR PROSTHETIC DEVICES

BACKGROUND OF THE INVENTION

The invention relates generally to articulated joints. More particularly, the invention relates to articulated joints for use in prosthetic devices, especially articulated joints which are to be used as knee joints.

Prosthetic devices which are utilized to replace a leg usually are provided with a knee joint which permits the prosthetic device to bend in much the same manner as a natural knee. Such a knee joint consists of two members which are able to pivot or rotate relative to one another. The knee joint usually includes a braking mechanism which becomes effective when a force is applied to the knee joint. Thus, when a person having a prosthetic device instead of a leg walks, the weight of the person bears on the prosthetic device at every alternate step. The purpose of the braking mechanism is to prevent relative rotation of the two members of the knee joint or, in other words, articulation of the knee joint, when the weight of a user bears upon it so that buckling of the knee joint at this time cannot occur.

A knee joint is known from the German Pat. No. 918,769 wherein the braking mechanism consists of a brake lining provided on one of the members of the knee joint and a brake shoe provided on the other member of the knee joint. Here, the brake shoe is rotatable by virtue of its being secured to that member of the knee joint which is pivotally mounted at the connection of the latter.

Another type of braking mechanism for a knee joint is known from the German Pat. No. 880,191. In this case, the braking mechanism consists of two coupling portions having a V-shaped cross section, each of the two members of the knee joint carrying one of these coupling portions. An elastic band, part of which lies exteriorly of the knee joint, is provided and the weight of a user on the knee joint in conjunction with the action of the elastic band causes the coupling portions to engage one another so as to prevent articulation of the knee joint.

The known braking mechanisms for knee joints, however, have certain disadvantages. In these constructions, the arrangement is such that the contact surface of at least one of the portions of the braking mechanism, i.e., that surface which comes into contact with the other portion of the braking mechanism during the braking action, is located outwardly tangential to that member of the knee joint which carries the respective braking portion. This not only makes for an unsightly appearance but also creates seams which may cause the clothes of a user to tear. There is a further disadvantage in that the known arrangements require a large amount of space which does not allow a cosmetically pleasing design to be achieved and, consequently, forces conventional leg prostheses to be of wooden construction. In other words, the known arrangements cannot be used in leg prostheses which are of skeletal construction and which are lined with a suitable material.

SUMMARY OF THE INVENTION

It is, accordingly, a general object of the invention to provide a novel articulated joint.

Another object of the invention is to provide an articulated joint having a braking mechanism which requires a minimum amount of space.

A further object of the invention is to provide an articulated joint having a braking mechanism the contact surfaces of which are not located exteriorly of the joint.

An additional object of the invention is to provide an articulated joint having a braking mechanism which is simple in its construction and effective in its operation.

A concomitant object of the invention is to provide an articulated joint having a braking mechanism which is not visible from the exterior of the joint and which is protected from outside influences.

More particularly, it is an object of the invention to provide an articulated joint for use in prosthetic devices having a braking mechanism which does not make for an unsightly appearance, will not tear the clothes of a user, and permits a cosmetically pleasing design to be achieved.

Still another object of the invention is to provide an articulated joint having a braking mechanism, and which is suitable for use in a fully lined leg prosthesis of skeletal construction.

In pursuance of these and other objects which will become apparent, the invention provides an articulated joint, particularly for use in prosthetic devices, which comprises a force-transmitting member and connecting means for permitting articulation of the joint. The connecting means includes a rotatable shaft and a braking means is provided for preventing rotation of the shaft and articulation of the joint when a force is applied to the latter. The braking means comprises collar means which at least partially surrounds the shaft circumferentially thereof. The collar means is able to yield elastically in a direction circumferentially of the shaft when a force is applied thereto and the collar means is connected with the force-transmitting member in force-transmitting relationship. Thus, when a force is applied to the joint, it is transmitted between the force-transmitting member and the collar means and causes elastic deformation of the latter. As a result, the collar means frictionally engages the shaft to thereby prevent rotation of the same and articulation of the joint.

It will be seen that, in accordance with the invention, the rotatable shaft of the connecting means for the joint itself cooperates in the braking action. Consequently, the novel articulated joint may be of extraordinarily small dimensions.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
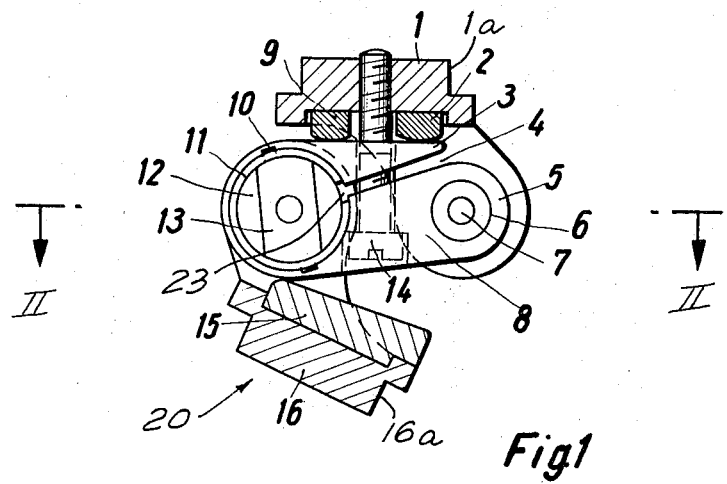
FIG. 1 is a view, partly in section, of an articulated joint according to the invention.
Figure 2:
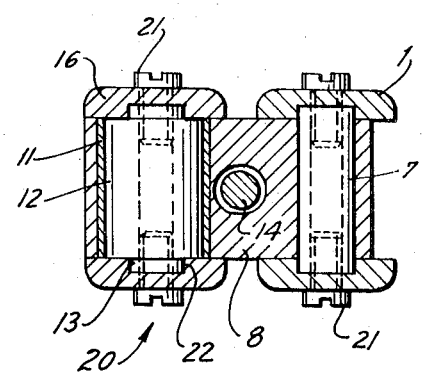
FIG. 2 is a view partly in section, along the line II—II of FIG. 1 viewed in the direction of the arrows.
Figure 3:
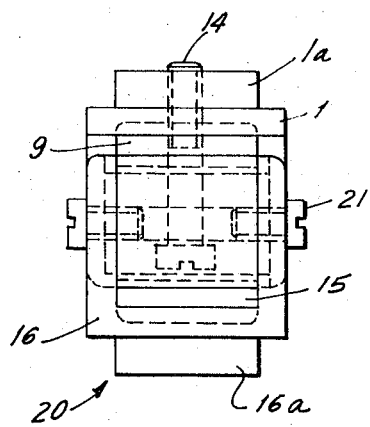
FIG. 3 is a view from the left-hand side of the articulated joint of FIG. 1.

Referring first to FIGS. 1–3, the novel articulated joint is indicated generally at 20. Connecting means for permitting articulation of the joint 20 includes a rotatable shaft 12 and spaced from the shaft 12 and extending substantially parallel thereto is another shaft 7. The shaft 7 is seated in a bearing 6.

A force-transmitting member 1 is mounted for rotation about the longitudinal axis of the shaft 7 and is connected with the latter in force-transmitting relationship. Another member 16 is mounted for rotation with the shaft 12, that is, advantageously the member 16 and shaft 12 are not able to rotate relative to one another. This is accomplished, as best seen in FIG. 2, by providing the shaft 12 with tongues 13 which engage grooves 22 provided in the member 16. Holding means may be provided for maintaining the members 1 and 16 in their requisite positions about the respective shafts 7 and 12. The holding means is shown here in FIGS. 2 and 3 as being in the form of screws 21 which thread into passages (indicated by dashed lines) extending in longitudinal direction of the shafts 7 and 12.

As most clearly seen in FIGS. 1 and 3, the members 1 and 16 have, respectively, end portions 1a and 16a. The end portions 1a and 16a are adapted to be secured, for example, to limbs of a prosthetic device.

A collar 8 circumferentially surrounds the shaft 12 and includes upper and lower lever portions 3 and 5 which are favorably, but not necessarily, integral with each other. The portion 5 of the collar 8 is swingably mounted about the shaft 7 so that it is connected with the member 1 in force-transmitting relationship. The collar 8 is provided with a slot 4 intermediate the portions 3 and 5 and the slot 4 extends in a direction substantially normal to the elongation of the shaft 12. The provision of the slot 4 has the result that the collar 8 does not circumferentially encircle the shaft 12 entirely and, concomitantly, the collar 8 is elastically yieldable in a direction circumferentially of the shaft 12. In other words, the portions 3 and 5 of the collar 8 are able to yield relative to one another. It may be seen that the portion 3 of the collar 8 is freely yieldable in a direction towards the portion 5. It is pointed out here that the screws 21 which hold the member 16 in position may thread into a passage provided in the shaft 12 whereas the screws 21 which hold the member 1 in position may thread into a passage provided in the member 1 itself.

In an advantageous embodiment of the invention, a sleeve 11 is interposed between the collar 8 and the shaft 12, that is, between the portions 3 and 5 of the collar 8 and the shaft 12. The collar 8 and sleeve 11 together constitute collar means for the joint 20. The sleeve 11 is provided with a slit 23 extending longitudinally therethrough. As a result, the sleeve 11 circumferentially surrounds the shaft 12 in part only and is elastically yieldable in a direction circumferentially of the latter. The sleeve 11 has projections 10 which engage grooves in the collar 8 so that the sleeve 11 and collar 8 are prevented from rotating relative to each other. The sleeve 11 is arranged in such a manner that it may be interchanged with another sleeve as may be desirable, for example, when the sleeve 11 wears out.

In a further favorable embodiment of the invention, two spaced abutment sections 2 and 9 are positioned at that side of the member 1 facing the collar 8. As seen in FIG. 1, the abutment section 2 may abut the portion 3 of the collar 8 in the region of the free end thereof whereas the abutment section 9 may abut the portion 3 at a location spaced from the free end of the latter. Although the sections 2 and 9 need not abut the portion 3 of the collar 8 at all times, they must at least at times abut the portion 3 in the manner indicated for a purpose which will become clear later. The section 2 is preferably made of a hard, low-friction material, examples of such a material being polyamide and polytetrafluoroethylene. The latter is also known commercially under the trademark "Teflon." The abutment section 9 is preferably composed of an elastic substance, for example, vibration damping rubber or polyurethane.

As mentioned earlier, it is advantageous when the member 16 and shaft 12 are fixed relative to one another. The member 16 may also carry an abutment 15 at that side thereof which faces the collar 8. The abutment 15 is adapted to abut the collar 8 when a force is applied to the joint 20.

It has already been explained that the collar 8 and sleeve 11 are capable of yielding elastically in a direction circumferentially of the shaft 12. The angle through which the collar 8 and sleeve 11 yield or deform when a force is applied to the joint 20 or, in other words, the amount by which these deform, may be regulated by means of an adjusting screw 14 which connects the portion 5 of the collar 8 with the member 1 and extends through the portion 3 and the slot 4. The diameter of the borehole in the collar 8 and the portion 3 is substantially larger than the diameter of the screw 14 and its head to allow the swinging movement of the portion 5 of the collar 8 about the shaft 7 inbetween a small range. Loosening or tightening of the adjusting screw 14 will increase or decrease the width of the slot 4 and, hence, the angle through which the collar 8 and sleeve 11 will deform in response to a force acting on the joint 20. Also, manipulation of the screw 14 allows the swinging movement of the collar 8 during deformation thereof to be so adjusted that the abutment sections 2 and 9 bear against the portion 3 of the collar 8. The screw 14 may be manipulated so as to obtain a desired degree of springiness of the joint 20. Although provision of the screw 14 is advantageous, it may be eliminated or some other adjusting means for regulating the degree of deformation may be provided.

Figure 4:
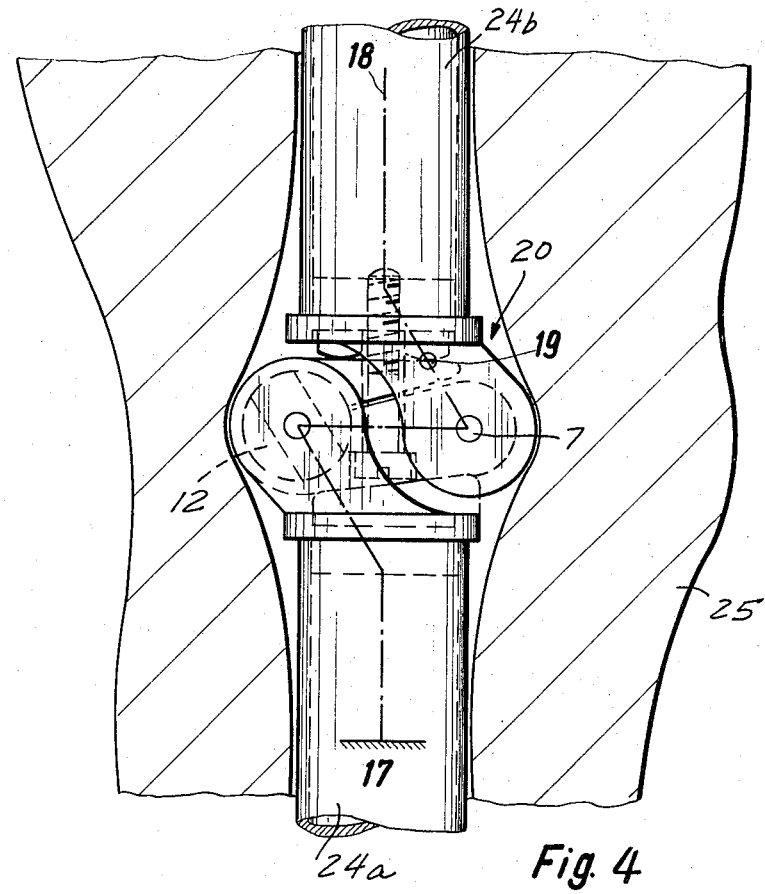
FIG. 4 shows the articulated joint of FIG. 1 in a leg prosthesis of skeletal construction which is provided with a cosmetic covering of foam material and indicates the manner in which a force is transmitted through the articulated joint.

The operation of the joint 20 is quite simple and will be explained with reference to FIGS. 1 and 4. Although this explanation will be with respect to the use of the joint 20 in a leg prosthesis, this is in no way intended to limit the applications of the joint 20 to such a use only. FIG. 4 shows a leg prosthesis consisting of a lower portion 24a and an upper portion 24b. The prosthesis is of skeletal construction and is covered with a foam material 25. The end portion 16a of the member 16 is secured to the lower portion 24a of the prosthesis and the end portion 1a of the member 1 is secured to the upper portion 24b of the prosthesis so that the joint 20 is interposed between the portions 24a and 24b of the prosthesis. It is noteworthy that the adjusting screw 14 itself may be utilized for attaching the member 1 to the upper portion 24b of the prosthesis.

It will be assumed in the following description that the adjusting screw 14 has been manipulated so as to obtain the desired degree of springiness in the joint 20. With reference now to FIG. 1, it will be seen that the joint 20 is here shown as being in its bent position, that is, the member 16 and abutment 15 are rotated away from the collar 8. This corresponds to the case where the weight of the user does not bear on the joint 20 as, for example, in the phase of walking where the leg prosthesis is lifted off the ground. FIG. 4 illustrates the situation in the next phase of walking where the leg prosthesis is placed on the ground and the weight of the user comes to bear upon it. The leg prosthesis is now in its straight position and it may be seen, with comparison to FIG. 1, that the member 16 has been rotated towards the collar 8 so that the abutment 15 abuts the lower surface of the latter. Thus, a force has now been applied to the joint 20 in the form of the weight of the user and the manner in which this force is transmitted between the ground, indicated schematically at 17, and a location such as 18 in the upper portion 24b of the leg prosthesis is indicated by the dashed and dotted line in FIG. 4. Starting from the ground 17, for example, and following the path along which the force is transmitted, the force is transmitted from the ground 17 to the member 16 via the lower portion 24a of the leg prosthesis and then to the abutment 15. Since the abutment 15 abuts the collar 8, the force is next transmitted through the latter to the shaft 12, from there across the collar 8 to the shaft 7 and then to the location 19 at which the abutment section 2 abuts the portion 3 of the collar 8. From here, the force is transmitted through the abutment section 2 into the member 1 and into the upper portion 24b of the leg prosthesis to location 18. It will be appreciated that because the collar 8 and the member 1 are connected in force-transmitting relationship and, consequently, the force is transmitted between the collar 8 and the member 1, the collar 8 is stressed. This has the result that the sleeve 11, which is interposed between the collar 8 and the shaft 12, is also stressed.

During this phase of walking, where the weight of the user bears on the leg prosthesis, swinging movement of the portion 5 of the collar 8 about the longitudinal axis of the shaft 7 occurs. This is accompanied by abutment of the abutment section 2 against the portion 3 of the collar 8 at the location 19. Consequently, the portion 3 of the collar 8, which is freely yieldable in a direction towards the portion 5 of the latter, and the portion 5 of the collar 8 are shifted towards each other. This causes a reduction in the width of the slot 4 located intermediate the portions 3 and 5. The reduction in the width of the slot 4 may be seen by comparing FIGS. 1 and 4. However, since the sleeve 11 is interposed between the collar 8 and the shaft 12, the reduction in width of the slot 4 causes, in turn, a reduction in the width of the slit 23 of the sleeve 11. As a result, the sleeve 11 frictionally engages the shaft 12 so that rotation of the latter and, concomitantly, rotation of the member 16 and the abutment 15, is prevented. Since the braking action of the collar means 8, 11 in conjunction with the shaft 12 is enhanced not only by the vertical loading of the joint 20 but also by the bending moment, the danger of buckling of the joint 20, i.e., the danger that the member 16 and abutment 15 will turn relative to the collar 8, during the phase of walking being presently discussed is eliminated when the braking force is sufficient and the proper angular relationship exists between the members 1 and 16. It is pointed out here that it may be necessary to manipulate the adjusting screw 14 in accordance with the weight of the user so that a sufficient force will exist to effect the braking action of the collar means 8, 11. It will also be seen that, by composing the abutment 15 of a suitable material, the abutment thereof against the collar 8 when the member 16 rotates from the position shown in FIG. 1 to that shown in FIG. 4 may occur noiselessly and may be damped so as to avoid shocks to the user.

It will be appreciated that the braking means according to the invention, in form of the collar means 8, 11 which cooperates with the shaft 12, requires very little space and that no seams are formed which may tear the clothes of the user.

When the weight of the user is removed from the leg prosthesis, the abutment section 9, which is made of an elastic material and which abuts the portion 3 of the collar 8, causes swinging movement of the collar 8 in a sense opposite to that when the force was applied thereto. This results in a release of the braking action so that there is no braking effect in the absence of a force on the joint 20. It will be apparent from the preceding description that the slit 23 of the sleeve 11 need not necessarily be an extension of or coaxial with the slot 4 of the collar 8. Furthermore, it will now be clear that the abutment sections 2 and 9 need not abut the portion 3 of the collar 8 at all times or for all relative positions of the members 1 and 16 but must do so only when a braking action is to be effected. It may also be seen that if the collar means 8, 11 is composed of elastically deformable material, a braking effect can be achieved even if the collar means 8, 11 circumferentially surrounds the shaft 12 entirely.

In a further favourable embodiment of the invention, the rotatable shaft 12 and the additional shaft 7 are located in a substantially horizontal plane. This gives an excellent static resistance. Besides an immediate disengagement of the brake will be assured when releasing by the springiness of portion 3 in connection with the abutment section 9. Furthermore it can be seen that the load indicating lines does not approach the connection line between the shafts 7, 12 but with a much larger bending angle of the prosthetic member. This is to say that the brake pressure is completely kept inbetween a large bending scope of the prosthetic member.

Another rather important advantage of the new construction results from the fact that the force-transmitting member 1 might be shaped identically with the member 16. The only difference will be the borehole for the screw 14, which has to be done subsequently. Thus the costs for manufacture and storage will be reduced substantially.

It will be understood that each of the elements described above, or two or more together, may also find a useful application in other types of construction and uses differing from the type described above.

While the invention has been illustrated and described as embodied in an articulated joint for prosthetic devices, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

1. An articulated joint, particularly a knee joint for an artificial leg, comprising a pair of substantially parallel transversely spaced shafts, the axes of which are located when a force is applied to said joint in a substantially horizontal plane; collar means having one portion substantially surrounding one of said shafts and having an upper and a lower portion laterally projecting from said one portion and being separated by a slot having a predetermined width in the absence of a force applied to said joint and said lever portions being elastically yieldable toward each other upon application of a force to said joint, said lower lever portion being pivotally connected to the other of said shafts; a lower joint member connected to said one shaft for turning therewith; and an upper force transmitting joint member turnably carrying the other shaft and engaging said upper lever portion for pressing the latter towards said lower lever portion to cause said collar means to frictionally engage said one shaft.

2. An articulated joint as defined in claim 1, wherein said force transmitting member comprises two spaced abutment sections, and said upper lever portion has a free end, one of said abutment sections being adapted to abut said upper lever portion in the region of said free end, and the other of said abutment sections being adapted to abut said upper lever portion at a location spaced from said free end when a force is applied to said joint.

3. An articulated joint as defined in claim 1, wherein said lower joint member comprises an abutment member adapted to abut said lower lever portion when a force is applied to said joint.

4. An articulated joint as defined in claim 1, wherein said upper and lower joint members are located along a common axis, when a force is applied to said joint and said shaft axes being respectively located at opposite sides of said common axis.

5. An articulated joint as defined in claim 1, and further comprising adjusting means for regulating said predetermined width so as to regulate the angle through which said collar means yields in response to a force applied to said joint.

6. An articulated joint as defined in claim 5, wherein said adjusting means comprises an adjusting screw connecting said lower lever portion with said force-transmitting member and extending through said upper lever portion and said slot.

7. An articulated joint as defined in claim 1, wherein said collar means comprises a sleeve member interposed between said portions and said rotatable shaft, said sleeve member frictionally engaging said rotatable shaft when a force is applied to said joint.

8. An articulated joint as defined in claim 7, wherein said sleeve member is provided with a slit extending longitudinally therethrough.

9. An articulated joint as defined in claim 2, wherein said one abutment section is composed of a hard, low-friction material, and said other abutment section is composed of an elastic substance.

10. An articulated joint as defined in claim 9, wherein said material is selected from the group consisting of polyamide and polytetrafluoroethylene.

11. An articulated joint as defined in claim 9, wherein said substance is selected from the group consisting of vibration damping rubber and polyurethane.

* * * * *